United States Patent
Hu et al.

(10) Patent No.: US 7,617,206 B1
(45) Date of Patent: Nov. 10, 2009

(54) METHOD FOR ANALYZING STATUS OF SPECIALIZED TANK FILES WHICH STORE AND HANDLE LARGE OBJECTS

(75) Inventors: Johnny Hu, Irvine, CA (US); Minh-Nguyet Tran, Cypress, CA (US); Courtney Chi Hoang, Fountain Valley, CA (US); Kung Yi Lin, Irvine, CA (US)

(73) Assignee: Unisys Corporation, BlueBell, PA (US)

( * ) Notice: Subject to any disclaimer, the term of this patent is extended or adjusted under 35 U.S.C. 154(b) by 326 days.

(21) Appl. No.: 11/398,929

(22) Filed: Apr. 6, 2006

(51) Int. Cl.
*G06F 17/30* (2006.01)
(52) U.S. Cl. .............................. 707/5; 707/3
(58) Field of Classification Search .................... 707/1, 707/3, 5
See application file for complete search history.

(56) References Cited

U.S. PATENT DOCUMENTS

| | | | |
|---|---|---|---|
| 5,561,793 A | 10/1996 | Bennett et al. | |
| 5,794,250 A | 8/1998 | Carino, Jr. et al. | |
| 5,819,301 A | 10/1998 | Rowe et al. | |
| 5,864,843 A | 1/1999 | Carino, Jr. et al. | |
| 5,873,083 A | 2/1999 | Jones et al. | |
| 5,924,100 A | 7/1999 | Chang et al. | |
| 6,144,970 A | 11/2000 | Bonner et al. | |
| 6,256,626 B1 | 7/2001 | Dong et al. | |
| 6,343,293 B1 | 1/2002 | Lyle | |
| 6,370,541 B1 | 4/2002 | Chou et al. | |
| 6,389,414 B1 | 5/2002 | Delo et al. | |
| 6,487,551 B2 | 11/2002 | Dong et al. | |
| 6,535,895 B2 | 3/2003 | Bonner et al. | |
| 6,542,893 B1* | 4/2003 | Quernemoen | 707/100 |
| 6,560,598 B2 | 5/2003 | Delo et al. | |
| 6,567,928 B1 | 5/2003 | Lyle et al. | |
| 6,578,046 B2 | 6/2003 | Chang et al. | |
| 6,606,617 B1 | 8/2003 | Bonner et al. | |
| 6,615,219 B1* | 9/2003 | Bruso et al. | 707/102 |
| 6,738,790 B1 | 5/2004 | Klein et al. | |
| 7,305,404 B2* | 12/2007 | Owens et al. | 707/101 |
| 2002/0046053 A1* | 4/2002 | Hare et al. | 705/1 |
| 2002/0073069 A1* | 6/2002 | Nakano et al. | 707/1 |
| 2002/0133476 A1* | 9/2002 | Reinhardt | 707/1 |
| 2007/0061373 A1* | 3/2007 | Kilday | 707/200 |
| 2007/0198482 A1* | 8/2007 | Allen et al. | 707/3 |
| 2007/0198575 A1* | 8/2007 | Tabellion et al. | 707/102 |

* cited by examiner

*Primary Examiner*—Shahid A Alam
*Assistant Examiner*—Alexey Shmatov
(74) *Attorney, Agent, or Firm*—James E. Goepel; Alfred W. Kozak

(57) ABSTRACT

A data management system is provided with a database which has internal tanks for storing large object data according to the size of the data involved. An analysis method and system is provided which will search out and calculate the space of each of the tank files involved and will report on how the space of each tank file is being used in terms of existing large objects, in terms of unused and available space, and in terms of deleted large object spaces.

2 Claims, 8 Drawing Sheets

ARCHITECTURE OF LOB ANALYSIS

INTERNAL TANKS
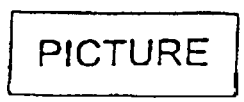  6K <= SIZE BYTES   SMALL TANK
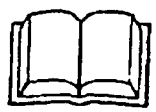  6K < SIZE <= 60K BYTES   MEDIUM TANK
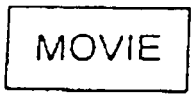  60K < SIZE BYTES   LARGE TANK
FIG. 4

TANK LAYOUT

| | |
|---|---|
| LOB-KEY | Record number or file relative record address of tank that start from 1 |
| LOB-STR | Structure number of the structure that owns the LOB item |
| LOB-WHEN-CREATED | Update level of the owner structure (LOB-STR) when the LOB item is created |
| LOB-RSN | RSN of the record which owns this LOB item |
| LOB-ID-NUM | A unique number assigned by DMSII for every LOB item in the database |
| LOB-OCCUR-NUM | Occurrence number of the LOB item if the LOB item is declared as an occurring item |
| LOB-BASE-KEY | Record number of the first record for the LOB item |
| LOB-DELETED | Deleted LOB flag to indicate that this LOB item is deleted |
| LOB-SIZE | Size of the LOB item in number of records |
| LOB-SIZE-BYTES | Size of the LOB item in bytes |
| LOB-LAST-STORED | location of the last byte written for the LOB item |
| LOB-GROUP-DATA | LOB data container which contains the actual data |

*FIG. 5*

SMALL LOB EXAMPLE

| | |
|---|---|
| LOB-KEY | = 4 |
| LOB_STR | = 9 |
| LOB-BASE-KEY | = 4 |
| LOB-FIRST | = 1 |
| LOB-DELETED | = 0 |
| LOB-SIZE | = 5 |
| LOB-RSN | = 1 |
| LOB-ID-NUM | = 1 |
| LOB-SIZE-BYTES | = 2,750 BYTES |

• • • •

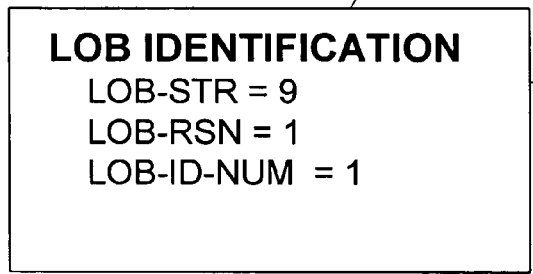

LOCATOR SET 62

LOB IDENTIFICATION
LOB-STR = 9
LOB-RSN = 1
LOB-ID-NUM = 1

• • • •

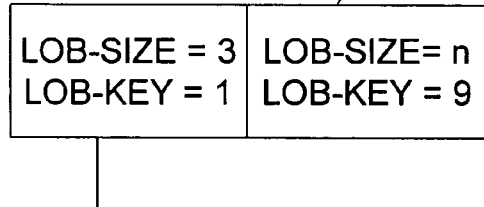

SPACE SET 64

| LOB-SIZE = 3 | LOB-SIZE= n |
|---|---|
| LOB-KEY = 1 | LOB-KEY = 9 |

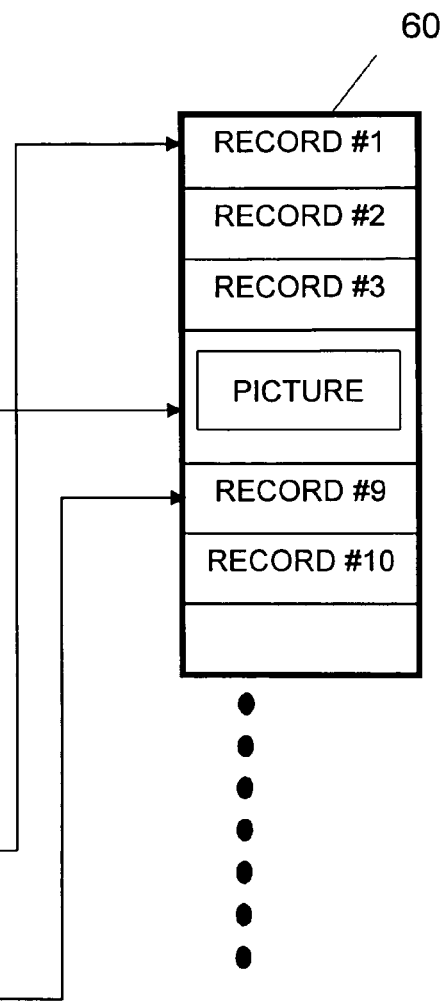

60

RECORD #1
RECORD #2
RECORD #3
PICTURE
RECORD #9
RECORD #10

Since there are two entries in Space-Set, Record #1 and Record #9 have LOB-DELETED Set to 1. This is the "deleted" flag.

*FIG. 6*

OUTPUT OF LOBANALYZER

| | SMALL TANK (0.6 KB/REC) | MEDIUM TANK (6 KB/REC) | LARGE TANK (24 KB/REC) |
|---|---|---|---|
| AVAILABLE FOR REUSE(KB): | 292.968 | 292.968 | 820.312 |
| > 50 RECORDS : | 20.00% | 0.00% | 0.00% |
| < 50 RECORDS : | 50.00% | 59.73% | 14.28% |
| < 10 RECORDS : | 30.00% | 40.27% | 85.71% |
| IN USE (KB) : | 292.968 | 585.937 | 1523.437 |
| IN USE/TOTAL CAPACITY : | 0.00% | 0.00% | 0.00% |
| NUMBER OF DELETED LOBS : | 40 | 12 | 10 |
| NUMBER OF ADJACENT : | 6 | 2 | 2 |
| ADJACENT/DELETE LOBS : | 15.00% | 16.66% | 20.00% |
| TOTAL CAPACITY (KB) : | 15804492.187 | 17326406.250 | 17326406.250 |

METHOD FOR ANALYZING STATUS OF SPECIALIZED TANK FILES WHICH STORE AND HANDLE LARGE OBJECTS

CROSS-REFERENCES TO RELATED CASES

This application is related to a co-pending application U.S. Ser. No. 11/390,820 filed Mar. 28, 2006, entitled "SYSTEM AND METHOD FOR CERTIFYING INTEGRITY OF A SPECIALIZED DATABASE HOLDING LARGE OBJECTS", and which is incorporated herein by reference.

This application is related to a co-pending application, U.S. Ser. No. 11/352,091, filed Feb. 10, 2006 entitled "SYSTEM AND METHOD TO MANIPULATE LARGE OBJECTS ON ENTERPRISE SERVER DATA MANAGEMENT SYSTEM", which is incorporated herein by reference.

This application is further related to a co-pending application, U.S. Ser. No. 11/103,904 filed Apr. 12, 2005 entitled "METHOD FOR STORING AND MANAGING LARGE DATA OBJECTS EXTERNAL TO THE DATABASE FOR OLE DB APPLICATIONS", which is incorporated herein by reference.

This application is also related to co-pending application, U.S. Ser. No. 11/371,726 filed Mar. 9, 2006 entitled "METHOD FOR CLEANUP OF DANGLING LARGE OBJECTS AFTER A SCHEMA CHANGE" and which is incorporated herein by reference.

This application is also related to co-pending application, U.S. Ser. No. 11/377,132 filed Mar. 16, 2006 entitled "SYSTEM AND METHOD TO FIND A DELETED LARGE OBJECT (LOB) SPACE WHICH CAN BE USED TO STORE A NEW LOB ITEM", which is incorporated herein by reference.

U.S. Pat. No. 6,366,900 issued Apr. 4, 2002 entitled "METHOD FOR ANALYZING THE CONDITIONAL STATUS OF SPECIALIZED FILES" which is incorporated herein by reference.

U.S. Pat. No. 6,411,969 issued Jun. 25, 2005 entitled "ENHANCED SYSTEM AND METHOD FOR MANAGEMENT OF SYSTEM DATABASE UTILITIES" which is incorporated herein by reference.

U.S. Pat. No. 6,351,744 B1 issued Feb. 26, 2002 entitled "MULTIPROCESSOR SYSTEM FOR DATABASE MANAGEMENT" which is incorporated herein by reference.

FIELD OF THE INVENTION

This method works to analyze and collect information on Tank structures that store Large Object (LOB) data to indicate available storage capacity, number of Large Objects stored, number deleted, and status of Tank storage.

BACKGROUND OF THE INVENTION

A Database Management System consists of a set of tools used to develop and manage a database. The present system utilizes a DMSII, which is a Database Management System available on a Unisys Corporation's ClearPath HMP NX, and the Unisys A-Series systems. A background for the Unisys DMSII systems is available in a publication of the Unisys Corporation, Document 8807 6625 000, entitled "Getting Started With DMSII" and published in September 1997 by the Unisys Corporation. The DMSII Utilities provide database backup and recovery capability for the entire database or for partial databases. The background operations of the DMSII utility enhancements are published in a Unisys Corporation publication Document 98037/4 and entitled "DMSII Utility Enhancements" published on Mar. 31, 1999.

Database Management Systems are used by many large and small businesses such as airline reservation systems, financial institutions, retail chains, insurance companies, utility companies and government agencies. The present Database Management System (DMS) in its form as DMSII is used to build database structures for items of data according to some appropriate logical model, such as relational, hierarchical, or network. Further, the Database Management System is used to manage the database structures and keep the structures in some other stable order while various application programs may be retrieving or changing the data. The present embodiment of DMSII has a data definition language designated as Data And Structure Definition Language (DASDL).

There are various tasks that are performed in database management and these involve (i) monitoring and optimizing database performance; (ii) the use of database control for monitoring multi-program database access; (iii) the function of the data integrity and safety done by integrity checking and preventing access to the same data by multiple applications occurring at the same time; (iv) the function of defining data structures and the data fields within them, including the function of modifying data structures; (v) data access operations and developing an application program to retrieve data or to change data; (vi) the function of data shareability to provide multi-program access without conflicts and provide database definitions to the application program; (vii) in database and data security, to prevent unauthorized database access; (viii) ensuring independence of application programs from certain data changes and preventing the revision of application programs every time a structure changes; (ix) in database and data recovery, performing the resumption of database operations after an interruption; (x) tracking data changes by keeping a record of every change made to the data; (xi) for data change integrity, ensuring that update changes are applied to, or removed from, the database in their entirety; (xii) providing a recent copy of the database as a reserve by backing-up the database and storing copies of audit files and all other database files; (xiii) providing for database scalability by growing or shrinking the database according to the ongoing needs at the time.

The DMSII provides standard software files that perform services and operations for all the databases connected to the system's Enterprise Server. This enables a viewing of a list of all these files on the user terminal.

In the ordinary course of operations, the application program user will submit changes to data or retrieve data while running a particular application program. Then, changes can be made which add, modify and delete data. A Database Administrator (DBA) keeps the database running smoothly and enforces the rules for data integrity and security. Users access the database through a given application program which itself does not access the data directly. Instead, the program interacts with the DMSII software and the database tailored software, which is directed by the access routines of the Data Management System to provide accesses, retrievals and the storage of data in the physical database file.

In regard to access, an application user will access the data in order to (i) make an inquiry to get a Read of data in the database, or (ii) to provide an update by doing a Write to the database thus, adding, deleting or changing data. The access for either purpose contributes to an operation on the database, which is called a "transaction".

A transaction is a sequence of operations grouped by a user program because the operations constitute a single logical change to the database. At the end and finality of the transaction point, the transaction is complete and without error, and it is considered as being committed to the database.

Actual real world data goes into special logical structures that are used by the Data Management System to store data. The database is designed to map categories of data into suitable structures. For example, the real world data would have a character with a structure called a "data set". An example of this would be a particular person's name. Then, real world data that can serve as an index of a whole data set has a structured name called a "set". This, for example, might be the social security number of any employee. Then there is data that can serve as an index of a data set under a certain condition, and this is called a "subset". This might be an employee's work number, for example. Then, there is data about each instance of a particular category and the structure name for this is "data item". An example of this might be the name and address of the category (person). Then, there is data related to the database as a whole, and this involves a structure called "global data item". An example of this might be the total number of employees in a company. Once there has been identification of the real-world data which is to be stored in the database, it is then necessary to define that data in relationship to the data structures of the data management system that holds data. When this data is defined within "structures", then the data management system and the system software programs an application program that can then understand how to make this data accessible for various inquiries and/or changes. This is done with the Data and Structure Definition Language (DASDL).

The Data Management System structures are the building blocks of the Data Management System database. Here, the "data set" has the purpose of storing data pertaining to a data category in a collection of records. A "set" has the purpose of indexing all records in a data set. A "subset" serves the purpose to index some records in a data set according to some given criteria. The "data item" is a structured name, which defines a unit of information about a category in a given field (column) of a data set record. A "global data item" serves the purpose of storing a unit of information about the entire database or any of its involved structures.

In general discussion about the types of data and the names of data structures, it is often seen that in a relational database, a "data set" is called a "table". A "set" or "subset" is frequently called an "index". A "data item" is often called a "field" or a "column", or is often called by its data name, for example, a project number. "Structures" are made of common file components designated as records and fields.

A record is a group of logically related data items in a file. Often, a record is called a row. Data items reside in different fields in the records. For example, a record might involve a series of data such as an employee's name, the employee's I.D., the employee's social security number and years of employment. A group of such records would constitute a file.

The operating system, which is used by the data management system, will treat the record as a unit. The system makes data available to users in records and not in individual single items of data. In programming languages, the record is the unit of data that the system reads from or writes to a file in one execution cycle of a Read or Write statement in a program.

If the application program wants to change a data item in a given record, the Data Management System brings a copy of the record from the physical storage over to memory, then enables that data item to be changed, and then writes the changed record back to the file.

A "field" is a consecutive group of bits or bytes within a particular component of a record, which will represent a logical piece of data. A field or column is defined by the description of the data item it is to hold. For example, if one field carries the name of an employee, this field in the record could be called the name field.

The "data set" is a physical file, that is to say, a collection of related data records stored on a random-access storage device, such as a disk in which the data resides.

A data set is kept up-to-date in several ways: (i) here, application programs add, change, or delete individual pieces of data or records stored in the data set; (ii) the Database Administrator (DBA) maintains the structure of the data set by keeping the data set within certain maximized limits, by adding, deleting or changing the definition of a data item, creating new sets or subsets, monitoring automatic processes that guard data integrity and creating guard files to enhance the security of the data.

A "set" is a separate stored file that indexes all the records of a single data set. The Data Management System uses sets in order to locate records in a data set. A set has no meaning apart from its related data set. The set structure enables an application program to access all records of a data set in some logical sequence.

A "subset" can be considered identical to a set, except that the subset need not contain a record for every record of the data set. A subset is a file that indexes none, one, several, or all of the records in a data set. The subset structure enables an application program to access only records of a data set that meet a particularly required condition.

For example, an application program may compile a list of people who are "managers". Thus, it is seen that the database designer created the "manager" subset. Thus, in order to retrieve a record of managers, the data management system can use the smaller file, that is, the subset, to quickly point to the corresponding records in the larger file, which is the data set. As with the set, the subset must also be kept up-to-date.

A "data item" is an element of data. In the Data Management System, a data item can also be the field (column) in the database record. For example, the social security number could be considered as a data item in the sample data set designated "person". The purpose of the data item is to describe the data to be stored. The data item provides the identity—type, size, location, and attributes—of one element of data for a database entity. When an application submits an update to a data item, the Data Management System will accept the update if it corresponds to the definition of a data item. Otherwise, the change is rejected and reported as an exception. The Database Administrator will add, delete or change the data item definitions.

There are a number of data items that are used by the Data Management System. These include the type called "alphanumeric" which includes words and characters, names, addresses, dates and titles. Then, there are data items designated as "numeric" which involve integers and decimals with or without signs. Then, there are data items designated as "real" which involve single precision floating point numbers that occupy one word. An example of this would be, for example, an employee's salary. Then, there are data items, which are called "Boolean" which involve TRUE and FALSE values.

The "global data item" is a data item, a group item, or a population item that is not part of any data set but still pertains to the database as a whole. Such global data items are stored in one special record called the "global record" in the DASDL declaration, which is outside the structured definitions. Sometimes the global record is placed just before the structured definitions in the DASDL file. The global data item has the purpose of holding permanent information about the database as a whole or about a particular data set. It also acts as a placeholder for information that can be derived from the database.

One of the most significant options in DASDL (Data And Structure Definition Language) is that it is possible to define the database as to whether the database is to be audited. The data management system supports both logging changes to a database (auditing the database) or not logging changes (maintaining an unaudited database). There are advantages in auditing a database since this assures the user that if a database failure occurs, there will be a record of database changes with which one can restore the database to a completely integral state and thus avoid loss of information and corruption of information.

SUMMARY OF THE INVENTION

A server and database file are provided in a Data Management System which enables the handling and manipulation of large objects (LOBs). Specialized storage facilities are provided called Internal Tanks which are used to store large object data (LOB) according to the size of the data in the large object. The Tanks are organized to hold data according to the size of large object data involved. Thus, there is a small Tank, a medium-size Tank and a large-size Tank.

In the operation of the Data Management System involved it is desirable to get some sort of information and reporting as to the total large object (LOB) usage space which is available in each of the Tank structures, that is to say the small Tank, medium Tank and large Tank. This is often necessary in order to enable the better performance for the finding of large objects or deleting large objects.

There is provided an enhanced DMUTILITY program. This program will call another corresponding program designated LOBUTILITY which is used to calculate various pieces of information from the various structures that store large object data (LOB). In the present arrangement the LOBUTILITY goes through each and every Tank dataset and then calculates the capacity of each Tank file as to the total number of large objects which are being used, the percentage of available space for storing new large objects. In further analysis the method also calculates the total number of deleted large objects, and also the number of deleted large objects that are adjacent to one another so as to enable a user to set up a request for a LOB COMBINE operation or additionally call for a SQUASH operation. These are possible only after a report is made to indicate the status of the various Tank files and their storage availability.

Thus, the present method provides for an analysis system which will search each of the Tank structures for the status and condition of large object data, that is to say whether LOBs had been deleted, or whether they still exist, or whether certain unused spaces are available to store new large objects.

BRIEF DESCRIPTION OF THE DRAWINGS

FIG. 4 is a sketch illustration of various Tank sizes.

FIG. 5 shows the Tank Layout which shows the various identifying parameters which apply to a Tank.

FIG. 6 is an example of a Small LOB and its Locator Set and Space Set.

FIG. 8 shows a typical output report for the LOB Analyzer System.

GLOSSARY ITEMS

Figure 1:
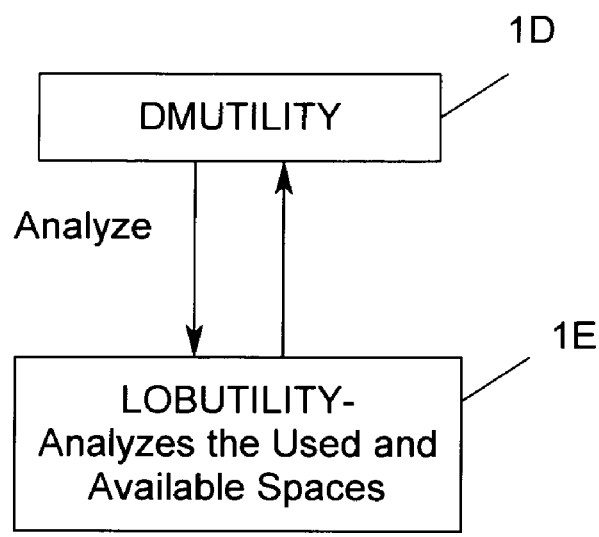
FIG. 1 is a schematic drawing to illustrate a picture of a function call between DMUTILITY and LOBUTILITY programs to analyze and collect information on Tank structures that store Large Object (LOB) data.

1. ACCESSROUTINES: The software component of the Enterprise Data Server product that is primarily responsible for the accessing (creating, modifying and deleting) of data in an Enterprise Data Server database. ACCESSROUTINES is also responsible for auditing all changes to the database.

2. ACR: See ACCESSROUTINES.

3. ADDR: The address of a record in the CAUDIT file: composed of Block Address; word address; and Structure number.

4. AUDIT FILE: Logically considered to be the sequential storage of Audit Records, it is actually the sequential storage of Audit Blocks that contain the Audit Records. Traditionally, an Enterprise Data Server Audit File has been implemented with a single MCP disk file.

5. AUDIT SECTION: With DMSII XE, multiple MCP disk files can be used to physically implement a single Audit File. Each of these disk files is referred to as a Section of the Audit File. The sequence of Audit Blocks is spread, round robin fashion, among the multiple Audit Sections.

6. AUDIT TRAIL: The sequence of Audit Files that are created that span the life of the database. Each Audit File is assigned an Audit File Number (AFN) starting at 1 when the database is created and incremented by one when each new Audit File is created. An Audit File may be Sectioned or not. The individual Sections of an Audit File all share the same AFN value, although they each have a unique section number within their Audit File.

7. BLOB—BINARY LARGE OBJECT: Initial portion is stored locally in the owning record; remainder is stored in an overflow area. Stored in "chunks"; chunk size and total length are returned as parameters to readers. Fully recoverable by the DBMS. BLOB type is both stored and returned to the applications (e.g., AVI, TXT, JPG, MP3, etc.) Individual components (chunks) are not accessible. Has a maximum length; typically 4 GB.

8. CLEANUP ARRAY: It has two parts: "CLEAN UP STRUCTURE" and "CLEAN UP ITEMS" array. The "CLEAN UP STRUCTURE" contains the structure number that owns LOB items that need to be cleaned up. The "CLEAN UP ITEMS" is a two dimensional array. The first dimension is the structure number and the second dimension is the LOB-ID. For example: In CLEAN UP STRUCTURE [1]=where 5 needs to be cleaned up. If this is true, then CLEAN UP ITEMS [5,1]=14 and CLEAN UP ITEMS [5,2] =24 means LOB ID 14 in structure #5 and LOB ID 24 in structure #5 need to be cleaned up.

9. CLEARPATH INTRACONNECT ARCHITECTURE (CIA): A high-performance, low-latency HMP interconnect technology for ClearPath NX5620, NX5820, NX6820 systems. It provides an efficient means for system software in the MCP and Windows environments to communicate with each other.

10. CLEARPATH MCP RELEASE: A regularly scheduled release of the system and networking software used in the Master Control Program (MCP) environment of Unisys systems.

11. CLEARPATH SERVER: A family of enterprise-class servers available from Unisys. This family includes the ClearPath servers, ClearPath A Series servers, and ClearPath 2200 Series servers.

12. CLOB—CHARACTER LARGE OBJECT: Stores character data. Initial portion is stored locally in the owning record; remainder is stored in an overflow area. Stored in "chunks", chunk size and total length are returned as parameters to readers. Fully recoverable by the DBMS. Local portion (or at least some part of it) may be used as an index key (values stored in the index set are of fixed length and may be padded). Restrictions on reorganization. Has a maximum length; typically 4 GB.

13. COMPACT DATA SET: In the Enterprise Database Server, a collection of related data records stored in a file. These records are not maintained in logical order. The length of each record can vary because the data set items can vary in size or in number of occurrences, or because the data set items are stored conditionally.

14. CONTROL FILE: The Control File is unique to each database and is used to maintain state information between each activation of a database, as well as across Halt/Loads. This file contains essential control information for the KEYEDIOII system. For example, this would indicate the maximum number of buffers that can be used or the maximum elements of memory which can be allocated, and so on.

15. CONTROL POINT: A logical construct within Enterprise Database Server used to limit the number of audit records that must be reprocessed in the event of a system failure. Data buffers which have been modified are guaranteed to be written to disk at least once every two control points, thus halt/load recovery need only process changes since the second to last control point in an audit trail. Control Points occur on a user-specified frequency defined in SYNC points.

16. CSC (CUSTOMER SUPPORT CENTER): The Unisys organization tasked with answering customer questions and problem resolution. CSC is the first line of support for customers after consultation with any on-site representatives.

17. DANGLING OBJECT: These are Large Objects in the Tank Files which remain after a Schema Change, but however, their owner records have already been deleted.

18. DASDL (DATA AND STRUCTURE DEFINITION LANGUAGE): The language used to specify the structure and specific software configuration for a database. This is also the abbreviated name for SYSTEM/DASDL, the generator used to create ("compile") Enterprise Database Server Description Files from the DASDL source.

19. DATA MANAGEMENT SYSTEM II (DMSII): A specialized system software package used to describe a database and maintain the relationships among the data elements in the database. This system is described in a September 1977 Publication of Unisys Corporation, entitled "Getting Started With DMSII," Unisys Publication No. 8807 6625-000.

20. DATA SET: (1) A disk file, potentially a group of disk files, containing data records all in a similar format. (2) An Enterprise Database Server structure type declared in DASDL. (3) In the Enterprise Database Server, a collection of related data records stored in a file on a random-access storage device. A data set is similar to a conventional file. It contains data items and has logical and physical properties similar to files. However, unlike conventional files, data sets contain other data sets, sets and subsets. A Structure is a Dataset or a Table. An Item is an element in a Table.

For example:

Customer is a dataset. Name, Address, Account, Car and Photo are items of the Customer Dataset.

Customer Dataset:

| Name | Alpha (50); |
|---|---|
| Address | Alpha (50); |
| Account | Real; |
| Items: | |
| Car | Internal Blob; |
| Photo | Internal Blob; |

"Alpha" denotes that the data is "character" data.

21. DATABASE OPERATIONS CENTER (aka DATABASE OPERATIONS CENTER or just DOC): A graphical interface for performing database administration functions.

22. DBA: Database Administrator.

23. DBCENTER: See DATABASE OPERATIONS CENTER.

24. DESCRIPTION FILE: This file contains the "machine readable" layout of every aspect of a database. A new copy is generated by DASDL for each format level and is used by SYSTEM/DMCONTROL, as well as DMINTERFACE in support of the language compilers.

25. DIRECT DATA SET: In the Enterprise Database Server, a collection of related data records stored in a file. These records are maintained in key value order. One unsigned numeric data item in the record is designated as the key item.

26. DIRECTORY: This is the LOB Directory. This is an internal array to store LOB item information. It has the structure number and name that contains the LOB item. It has the database level when the LOB item is added to the SCHEMA. It has a unique LOB-ID generated by the system for each LOB item. Example of Directory Dataset for LOB Structure:

| LOB-STR-DIR DATA SET | |
|---|---|
| ( | |
| LOB-STR | NUMBER(4); |
| LOB-WHEN-CREATED | NUMBER(8); |
| LOB-ID-NUM | NUMBER(4); |
| LOB-STR-NAME | ALPHA(18); |
| )EXTENDED; | |

27. DMCONTROL: SYSTEM/DMCONTROL is a database utility program that is capable of understanding the database Description File and is used to maintain and recover the Control File.

28. DMINQ: An interface that allows programs written in DMALGOL to communicate directly with ACCESSROUTINES (Glossary Item #1).

29. DMINTERFACE: An interface used by the language compilers to translate the properties of a database into the record area offsets used by the compiled application program.

30. DMSII (Unisys DATA MANAGEMENT SYSTEM II): See ENTERPRISE DATA SERVER.

31. DMSUPPORT: The DMSupport Library is unique to each format level of a database. It contains the mappings between the storage layouts used by the database and those used within the application program record areas.

32. DOC: See DATABASE OPERATIONS CENTER.

33. ENTERPRISE DATABASE SERVER: See UNISYS e-@action ENTERPRISE DATABASE SERVER FOR CLEARPATH MCP.

34. ENTERPRISE DATABASE SERVER: The comprehensive, primary database management software package developed by Unisys that is in use on Unisys A Series and ClearPath families of mainframe computers.

35. FILE NAME: (1) A unique identifier for a file, consisting of 1 to 14 name constants separated by slashes. Each name constant consists of 1 to 17 letters, digits, hyphens, and/or underscores. A file name can be optionally preceded by an asterisk (*) or usercode, and optionally followed by "ON" and a family name. (2) in RPG, a name that designates a set of data items. (3) In COBOL, a user-defined word that names a file described in a file description entry or a sort-merge file description entry within the FILE SECTION of the DATA DIVISION.

36. HOST LANGUAGE INTERFACE (HLI): An interface to the Data Management System II (DMSII) is provided in the BDMSALGOL, BDMSCOBOL74 and BDMSCOBOL85. BDMSALGOL is based on Unisys Extended ALGOL which contain extensions that enable a programmer to declare and use databases. BDMSCOBOL85 is based on Unisys Extended COBOL85 which contain extensions that enable a programmer to declare and use databases.

37. INDEX: This is a term which also indicates the key.

38. INDEX FILE: A file which contains the key and a pointer which points to a record of the data file. The index file is used to search for the data record based on a key value for efficient rapid access.

39. INDEXED ORGANIZATION: The permanent, logical file structure in which each record is identified by the value of one or more keys within that record.

40. INDEXED SEQUENTIAL ACCESS METHOD (ISAM): A method that provides efficient, flexible random access to records identified by keys stored in an index.

41. KEY: (1) A field used to locate or identify a record in an indexed file. (2) In COBOL, a data item that identifies the location of a record, or a group of data items that identifies the ordering of data. (3) In Data Management System II (DMSII), a field that serves as a retrieval key for a set or subset.

42. KEY FIELD: This is a portion of a data record which contains the key data.

43. KEYEDIOII: This is a software methodology designated as Unisys Indexed Sequential Access Method (ISAM) software for COBOL 74 and Report Program Generator (RPG) programming languages. It is based on DMSII (Data Management System II) so as to take advantage of the features of DMSII. KEYEDIOII is basically described in Unisys Corporation Publication 5044043.372 (1988).

44. LINC (LOGIC AND INFORMATION COMPILER): A Unisys marketed product for application program development.

45. MASTER CONTROL PROGRAM: The Operating System developed by Unisys that is in use on Unisys A Series and ClearPath families of mainframe computers.

46. MCP: See MASTER CONTROL PROGRAM.

47. MODEL DB: A process that allows two or more structurally identical databases to share the same DMSupport Library. When Modeling is used, applications can be run interchangeably against any of the models by using Database Equation. Each Modeled database has its own Control and data files.

48. OBJECT: This is the large amount of data that is stored internally for an artifact such as a picture or book, movie or video.

49. NX/DB CENTER: See DATABASE OPERATIONS CENTER.

50. OLE DB: A Unisys product that is compatible with the Microsoft™ OLE DB standards. It is used to access databases of all types across multiple platform and Operating System types.

51. RDB: See REMOTE DATABASE BACKUP.

52. RECORD KEY: A key, either the prime record key or an alternate record key, with contents that identify a record within an indexed file.

53. RECORD SERIAL NUMBER (RSN): A read-only value assigned by Enterprise Database Server and guaranteed to be unique within a dataset (but not within a database). Once a record is created, its RSN value will not change, nor is the RSN value re-used after the record is deleted. The primary use of Record Serial Number (RSNs) is to reduce the overhead associated with reorganizing sets that allow duplicates but do not have DUPLICATES FIRST/LAST specified. RSN items may be used as a key for a set and can be interrogated by application programs to identify specific records.

54. RMOTE DATABASE BACKUP (RDB): A disaster recovery capability for DMSII databases that enables the replication of an audited (primary) database on a second host. The replicated (secondary) database is kept up-to-date with the primary database through the application of audits from the primary database. The secondary database can take over the role of the primary database.

55. REORGANIZATION: The process used to change the physical layout of a data structure, as well as to add or delete structures.

56. REORGDB: (1) A new mode of reorganization that provides uninterrupted access to a Live database while the reorganization is in progress. The reorganization runs in the background using a Model database while updates to, and inquiries of, the Live database continue. After a successful reorganization to the new DASDL specification, the captured updates are applied to the reorganized Model database and the updated data structures are migrated to the Live database. (2) An optional specification that can be used within SYSTEM/BUILDREORG.

57. RSN: See RECORD SERIAL NUMBER.

58. SCM: The description of a database, its data components, and their interrelationships. In Enterprise Database Server terms, it is typically referred to as the "DASDL".

59. SCHEMA CHANGE: This is initiated by users. An illustrative example of Schema Change is shown below:

For example—I is the Original Schema for employee dataset which contains information about an employee. It has no picture id. With this invention, users can modify the Schema to add a new item called PHOTO. This change is made because of some business reason. II is the changed Schema. For example—Number (5)—indicates the structure number has 5 digits. Also ALPHA (20) indicates that 20 "characters" (EBCDIC) are involved.

I. Before Change:

```
EMPLOYEE DATASET
(
    EMPLOYEEID      NUMBER(5);
    LASTNAME        ALPHA(20) REQUIRED;
    FIRSTNAME       ALPHA(10) REQUIRED;
    TITLE           ALPHA(30);
    BIRTHDATE       GROUP
    (
        DATE        NUMBER(2);
        MONTH       NUMBER(2);
        YEAR        NUMBER(4);
    );
    HIREDATE        GROUP
    (;
        HDATE       NUMBER(2);
        HMONTH      NUMBER(2);
        HYEAR       NUMBER(4);
    );
    ADDRESS         ALPHA(50);
    CITY            ALPHA(30);
    REGION          ALPHA(15);
    POSTALCODE      ALPHA(6);
    COUNTRY         ALPHA(15);
    HOMEPHONE       ALPHA(24);
    );
)EXTENDED = TRUE;
```

II. After Change:

```
EMPLOYEE DATASET
(
    EMPLOYEEID      NUMBER(5);
    LASTNAME        ALPHA(20) REQUIRED;
    FIRSTNAME       ALPHA(10) REQUIRED;
    TITLE           ALPHA(30);
    BIRTHDATE       GROUP
    (
        DATE        NUMBER(2);
        MONTH       NUMBER(2);
        YEAR        NUMBER(4);
    );
    HIREDATE        GROUP
    (:
        HDATE       NUMBER(2);
        HMONTH      NUMBER(2);
        HYEAR       NUMBER(4);
    );
    ADDRESS         ALPHA(50);
    CITY            ALPHA(30);
    REGION          ALPHA(15);
    POSTALCODE      ALPHA(6);
    COUNTRY         ALPHA(15);
    HOMEPHONE       ALPHA(24);
    PHOTO           INTERNAL BLOB OCCURS 5 TIMES;
    );
)EXTENDED = TRUE;
```

60. SECTION: In Enterprise Database Server New Plateau, a section is a portion of a data structure that can be physically accessed independently of other portions of the structure. For data sets and audit files in New Plateau, each section is implemented as a separate physical file. For sets, sections exist within a single physical file but can be accessed without impact on or from other sections within the same file.

61. STRUCTURE NUMBER: This is a number which identifies a LOB item to be cleaned out.

62. SET: (1) In the Enterprise Database Server, a file of indexes that refers to all the records of a single data set. Sets are automatically maintained by the system. Sets permit access to the records of a data set in some logical sequence and are normally used to optimize certain types of retrievals of the data set records. (2) A collection of information that the Enterprise Database Server uses to locate records in a data set. In Inquiry, sets can be used in SELECT or DISPLAY commands to designate how a data set should be accessed.

63. SIB2: A two-dimensional array of Structure Information Blocks that is unique to each database opener. Each row of the array corresponds to a structure that has been either explicitly or implicitly opened by the application and is the application's state information as it pertains to that structure.

64. SIBDESC (SIB Description Array): This contains basic information such as structure number and update levels for each structure opened by a database user. This information is built by the language compiler and used by the ACR (Access Routines) during the application's open process which also constructs the SIB2 array.

65. SIM (SEMANTIC INFORMATION MODEL): This is an optional component of Enterprise Database Server that allows the database description to contain an organization's business case rules. These rules are then enforced by the ACCESSROUTINES, rather than having to be coded into the application programs.

66. SLOT: This is a memory space that can be used to store LOB objects. It is composed of multiple numbers of records. It can be in memory space or disk space. Each slot has a size. The size is varied according to the amount of LOB data stored. An UNUSED SLOT is a slot that is new and has never been used for storing LOB objects. A DELETED SLOT is a slot that was used to store LOB objects. When the LOB object was deleted the slot became a DELETED SLOT. Here an associated FLAG BIT is set=0.

67. STANDARD (FIXED-FORMAT) DATA SET: In the Enterprise Database Server, a collection of related data records stored in a file in which all the records are of the same type and size.

68. STANDARD (VARIABLE-FORMAT) DATA SET: In the Enterprise Database Server, a collection of related data records stored in a file in which not all the records are of the same type and size.

69. STRUCTURECLONE: An RDB (Remote Database Backup) procedure that uses a DMUTILITY dump from a primary host following an OFFLINE structure format change, together with the secondary host audit trail to synchronize the structure at the remote host.

70. STRUCTURE: This is a Dataset or Table as illustrated in the glossary item for "DATASET".

71. SUBSET: (1) An index structure that is identical to a set, except that the subset need not contain a record for every record of the data set. A set must index every record in its associated data set, whereas a subset can index zero, one, several, or all data set records. A subset might or might not be automatically maintained by the Enterprise Database Server.

(2) A collection of indexes or pointers to the records of a single data set. A subset is used to access selected members of that data set and to represent relationships between the data set records.

72. SUPPORT LIBRARY: A library that is associated with a function name. User programs can access a support library by way of its function name instead of its code file title. The operator uses the SL (Support Library) Operator Display Terminal (ODT) command to link function names with libraries.

73. UCF (USER COMMICATION FORM): A form used by Unisys customer to report problems and express comments about Unisys' products to support organizations.

74. UWA (USER WORK AREA): This contains record of a dataset. BDMS compilers allocate this array row when user programs are compiled.

75. UNISYS e-@ction ENTERPRISE DATABASE SERVER, EXTENDED EDITION FOR CLEARPATH MCP: An evolution of the standard Enterprise Database Server product in the areas of scalability, capacity, and availability. See also UNISYS e-@ction ENTERPRISE DATABASE SERVER FOR CLEARPATH MCP.

76. UNISYS e-@ction ENTERPRISE DATABASE SERVER FOR CLEARPATH MCP: A specialized system software package used to describe a database and maintain the relationships among the data elements in the database.

See also UNISYS e-@ction ENTERPRISE DATABASE SERVER, EXTENDED EDITION FOR CLEARPATH MCP.

77. URL (UNIVERSAL RESOURCE LOCATOR): The URL is the address of a resource, or file, available on an Internet or Intranet. The URL contains the protocol of the resource: (e.g. http:// or ftp://) The domain name for the resource, and the hierarchical name for the file (address). For example, a page on the Internet may be at the URL http://www.learnthat.com/define/u/url.shtml. The beginning part, http:// provides the protocol, the next part www.learnthat.com is the domain, and the main domain is learnthat.com, while www is a pointer to a computer or a resource. The rest, /define/u/url.shtml is the pointer to the specific file on that server.

78. VDBS (VISIBLE DATABASE STACK): A set of commands that are issued directly to a database stack to interrogate or change some aspect of the database configuration. This is sample entry:

Use the "Gloss" paragraph style. Place the term or expression to be defined on the first line. Then enter 1 or 2 line breaks (<SHIFT><ENTER>)—not paragraph breaks. Next, enter the definition. The key is to keep one entry as one paragraph. If this is done, you can select all of the glossary entries and use the sorting function (under the Table menu) to alphabetize them.

General Overview

Figure 3:
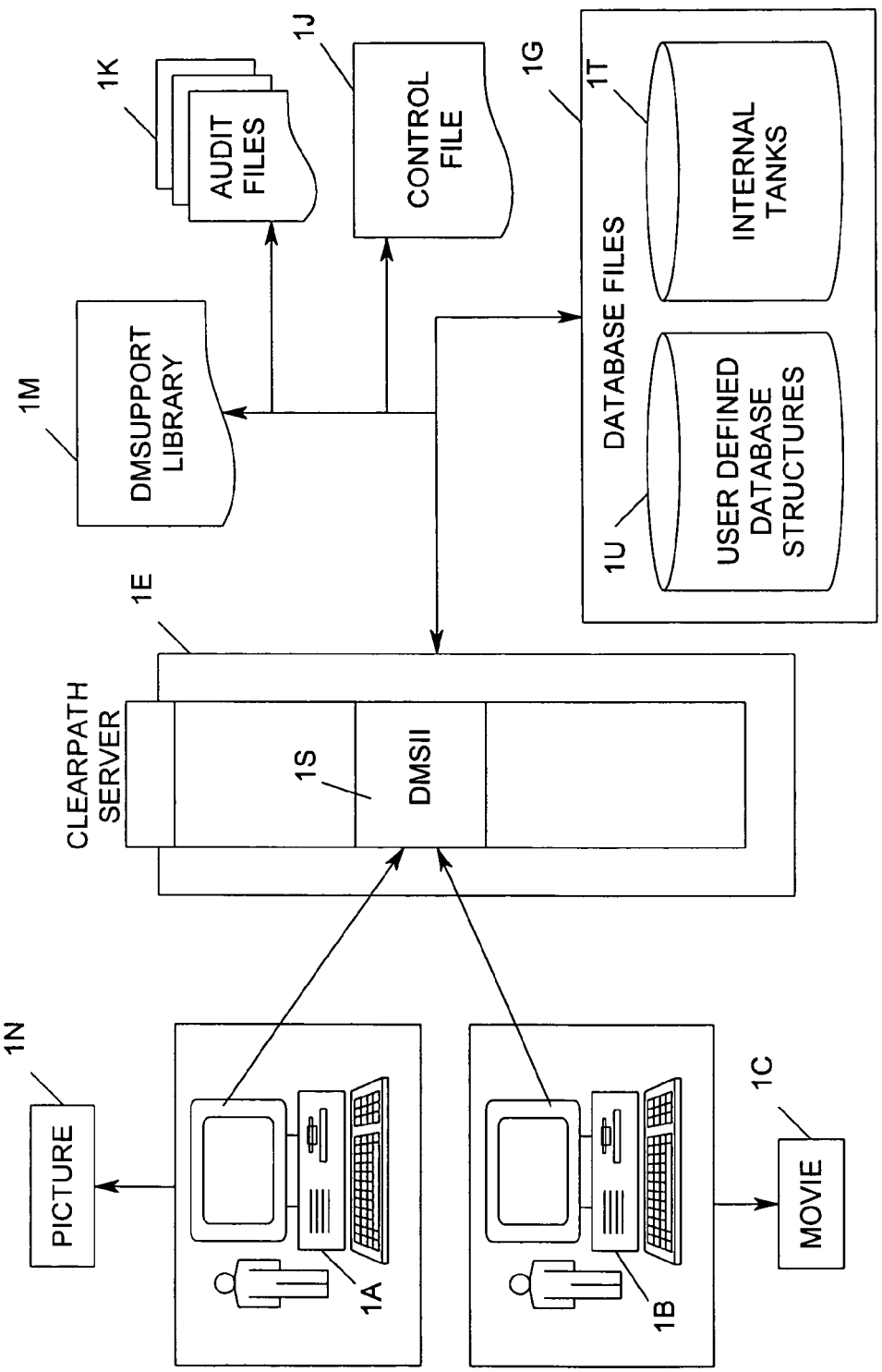
FIG. 3 is a drawing of the server and database arrangement used to implement the analysis and production of a storage report regarding the usage of large objects (LOB).

Referring to FIG. 3, there is seen an overall block diagram of the present system and method for manipulating large objects on an Enterprise Server Data Management System.

As seen in FIG. 3, there is shown a client terminal 1A and another client terminal 1B. The client terminal 1A can be used to take a still picture, such as item IN so that this picture can then be downloaded into the Data Management System DMSII via a database engine, 1S, (DMSII) inside the ClearPath Server 1E. The database engine 1S provides an ACCESSROUTINES set of programs for managing the server database 1G in accessing data and/or creating, modifying or deleting data.

Similarly, the PC client terminal 1B can be used to access a set of digital motion pictures (movie 1C) which can then be loaded into the Data Management System 1S inside the ClearPath Server 1E.

Similarly, the PC client terminals 1A and 1B can also be used to retrieve such types of information from database files 1G should this be desired. Thus, PC terminal 1A can retrieve still pictures and indicate them at 1N or else PC terminal 1B can retrieve movie pictures 1C for display on its terminal.

The ClearPath Server 1E is one of a family of Enterprise-class Servers available from the Unisys Corporation. This family includes the ClearPath Server, the ClearPath A-Series Server, and the ClearPath 2200-Series Server.

The data management system (DMSII) designated 1S is also designated as a database engine and provides a specialized system software package used to describe a database and maintain relationships among a database.

A DM support library 1M is connected to a set of audit files 1K and a control file 1J. These files and the support library are connected to the data management system 1S and also to the database files 1G.

The DM Support Library is a tailored library that contains "entry points" for application programs to obtain database information at runtime. The Accessroutines can access the support library by way of its entry points.

The audit files 1K are logically considered to be the sequential storage of Audit Records. This is actually the sequential storage of Audit Blocks that contain Audit Records. Traditionally, an Enterprise Data Server Audit File is implemented with a single Master Control Program (MCP) disk file.

With the Data Management System II, (DMSII) then multiple MCP disk files can be used to implement a single Audit File. Each of these disk files is referred to as a "Section" of the Audit File.

The Database Control File 1J is a file unique to each database and is used to maintain state information between each activation of the database, as well as across Halt/Loads. This file contains essential control information for the KEYE-DIOII system used for indexing of files. For example, this would indicate the maximum number of buffers that can be used or the maximum elements of memory which can be allocated.

Further in FIG. 3 there is seen the Database Files 1G. As seen within the database files, there is a series of internal tanks, 1T. These tanks can be sectioned off according to their size and categorized as—small tank, medium tank, and large tank. The "Internal Tanks" are structures automatically generated when Users declare LOB (large object) items in the DASDL (Data and Structure Definition Language).

A tank is a physical data file or container of large object data. The present configuration holds three Tanks where Tank 1 (Small) holds LOB data up to 6 KB. Tank 2 (Medium) holds data up to 60 KB while Tank 3 (Large) holds LOB data greater than 60 KB.

Now, within the Database Files, 1G there are user-defined database structures, 1U.

User Defined Database Structures, 1U, consist of data sets, set, subsets, data items and global items that are defined by users in DASDL. In brief summary:

A dataset is a collection of related data records stored in one or more files on a random access storage device.

A set is a structure that allows access to all records of a dataset in some logical sequence.

A subset is similar to a set. Unlike a set, a subset need only refer to certain selected records in the data set.

Data item is a field in a database record used to contain an individual piece of information.

Global data are the data items that are not a part of the data set. Global data items generally consist of information such as control totals, hash totals, and populations, which apply to the entire database. All global items are stored in a single record.

Now referring to FIG. 4, there is shown the organization of the internal tanks used for the storage retrieval and manipulation of large objects (LOBs).

The small tank will be seen to handle items such as a photo, which involves sizes of 6K bytes or less.

The next category of tank is the medium tank. This tank will handle large objects that are greater than 6K bytes or less than 60K bytes. This might for example involve a book or a novel.

Then there is the large tank section which involves sizes of digital data which are greater than 60K bytes. This might, for example, cover the digital information in a movie program.

Now referring to FIG. 5 there is seen a listing of a particular tank layout. This indicates the various parameters involved for each particular large object that is stored in that particular tank. This of course applies to each one of the three tanks which are the small, medium, and large tanks.

The parameters shown here in the tank layout give a set of information which particularizes the status of a particular large object in the tank.

The Usage Space is the size of a Tank File. This "usage space" includes the space of (i) large objects (LOBs) in use and (ii) the space of large objects (LOBs) not in use, that is to say, which have been deleted or check boarded.

The total capability, in words, for each Tank will be equal to (the last record of each tank) multiplied by (the record size).

For example, as seen in FIG. 6, the total capability of a small tank 60 is 13 multiplied by 100 which is equal to 1300 words. Then the total capability, in KB, is the total size (in words) multiplied by 6/1000. For example, the total capability of the small tank 60 in FIG. 6 is 1300 multiplied by 6/1000 which is equal to 7.8.

Now further, referring to FIG. 6 which is an example of a small LOB (large object). At the top is shown the special parameters which apply to the Photo item shown in the file 60. The Picture is specified by the locator set 62 which provides for LOB identification.

The Space Set 64 provides the parameters which show the start of the file at record number one and the end of the file 60 at record number nine. And as indicated in FIG. 6, since there are two entries in the Space Set 64, then record number 1 and record number 9 have their "LOB-DELETED" set to the number 1, this is the deleted flag.

Further in FIG. 6, there is a set of parameters shown at the top of the diagram for a small LOB example, these parameters can be designated as the Tank Dataset. These parameters are in a list starting with LOB-KEY=4 over to the final LOB-SIZE bytes=2750 bytes.

Figure 7:
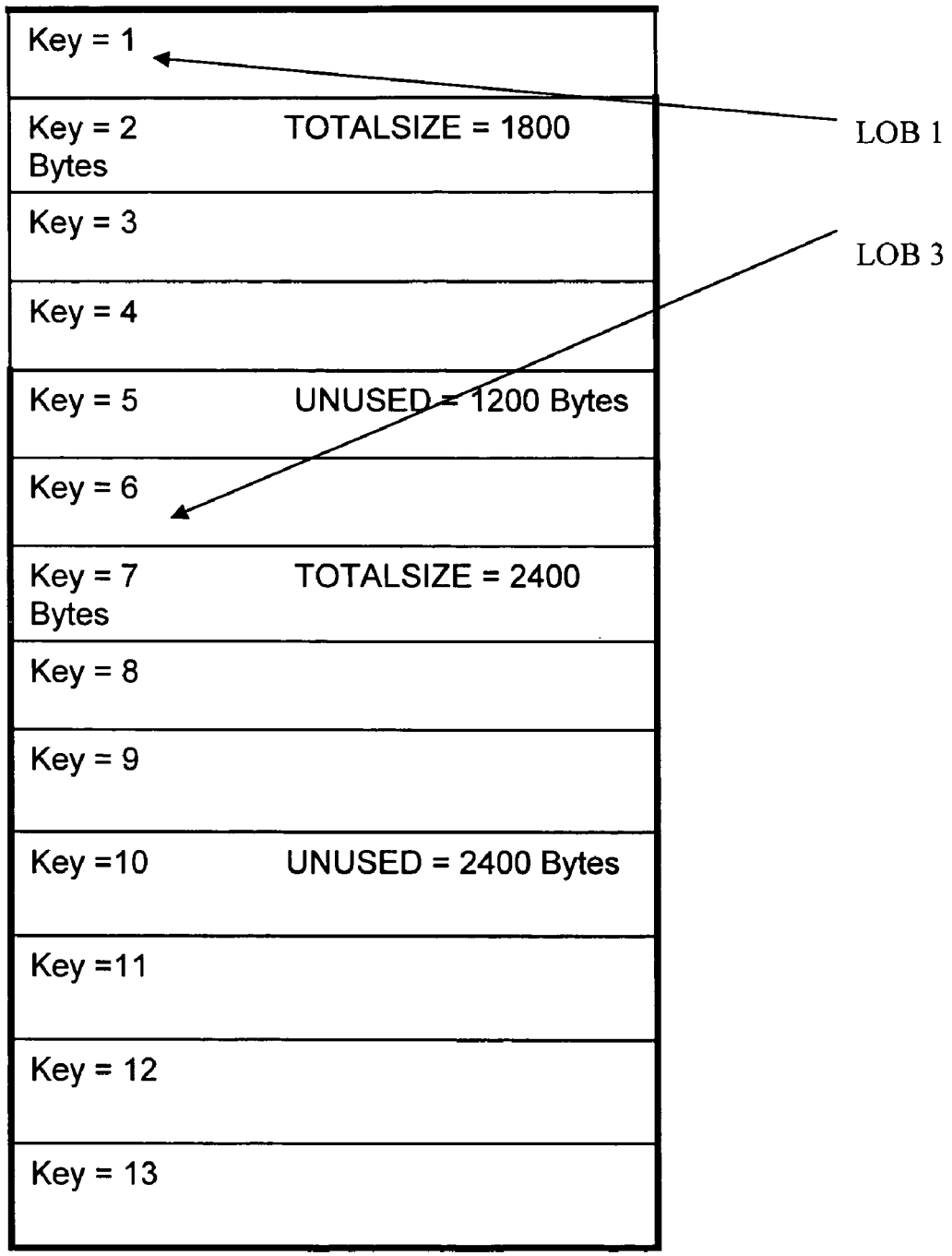
FIG. 7 illustrates a Tank file showing the size of Used areas and also Unused areas.

Now referring to FIG. 7, there is seen an example of a Tank File in which certain areas will be holding large objects (LOBs) and certain areas may be unused. In this tank there are two large objects (LOBs) designated as LOB1 and LOB3. The LOB1 (key 1-3) has a size of 1800 bytes and of course operates and occupies those record keys of key 1 to key 3.

The large object LOB3 is a total size of 2400 bytes and is occupying the record keys, key 6-key 9. Thus record 6-record 9 are occupied by the LOB3.

The Small Locator-Set will have two entries pointing to LOB1 and LOB3. The last key of the Small-Space-Set is key 13 which means that there are nine records involved. Each record is 600 bytes and the total used space is 600 multiplied by 13 which is equal to 7,800 bytes.

It will be noted that there is an unused space of 1200 bytes at record keys 4 and 5. Likewise there is an unused space of 2400 bytes at the record keys 10-13.

As will be indicated hereinafter the Analyzer system will work to report the space usage of Tank Datasets. This will show the tank dataset size in words, in bytes, in the percentage of "deleted" data and also the percentage of available spaces.

DESCRIPTION OF PREFERRED EMBODIMENT

Referring to FIG. 1 there is seen a block designated 1D and marked DMUTILITY. The DMUTILITY program operates to provide a number of functions including analyze, squash, combine or cleanup operations.

The presently described system and method is focused on the Analyze function.

As seen in FIG. 1 in the block LOBUTILITY this method operates to build a list to call the LOBUTILITY program 1E. This is utilized after a large object (LOB) cleanup operation.

In FIG. 1 the DMUTILITY program will accept commands and then invoke the LOBUTILITY program to perform the requested work.

The LOBUTILITY program provides for several functions:

(a) The Analyze function: this will analyze the disk usage of the large objects (LOBs) for each individual LOB tank (small, medium, large).

(b) The Cleanup function: the program will delete those LOB objects which are no longer valid due to operations of the data and structure definition language (DASDL).

(c) The Combine function: here the program operates to combine any adjacent available spaces in the memory tank.

(d) The Squash function: here the program will move all available space to the end of the file whenever possible.

Thus, while the LOBUTILITY program is capable of several functions, the present system and method will be concentrated only on the Analyze function. Thus, the LOBUTILITY program is called to analyze the spaces in the small, medium and large tank files in order to find those spaces which are in use and those spaces which are available.

Thus, in summary, the LOB analyze function will produce a report that shows the total of available space for re-use and it will then itemize the percentage of space according to three categories such as the following:

(i) category one: shows the situation where more than fifty records are involved. That is to say the percentage of available space for re-use that has more than fifty existing records.

(ii) category two: where less than fifty records are involved, that is to say, the percentage of available space for re-use that has between ten to fifty adjacent records.

(iii) category three: where less than ten records are involved, that is to say, the percentage of available space for re-use that has less than ten adjacent records.

This is accomplished by sorting all entries in Space-Set. Each entry in a Space-Set has a pair of information items (Key Number and Size). By sorting every entry in the Space-Set, there is developed a list in ascending order of (Key Number and Size) pair.

Then by looking at the size, we can know the available space is either greater than fifty records, or less than fifty records, or less than ten records. And this information can be tallied to issue a report. This report is shown in kilobytes for each of the tanks (small, medium, large).

The Analyze function will also determine the total number of deleted large objects (LOBs). This is recognized because a deleted LOB has an entry as shown in the Space-Set 64 of FIG. 6. Here there is a "deleted flag" in the associated record of a deleted LOB. By checking the "deleted flag" we then know that the LOB is deleted.

Another aspect of the Analyze function is to determine the number of deleted LOBs which are adjacent to one another. This is done by examining the size of each deleted LOB. The LOB size, when divided by the individual record size will indicate the number of records involved. The first record number, (the first record of file 60, FIG. 6) indicates the LOB set and this plus the total number of records plus one then indicates the first key of the next large object (LOB).

Thus, if "LOB-deleted" flag of the next LOB is set, then we know that two deleted large objects (LOBs) are adjacent to one another.

As an example, suppose there are ten records in the Small-Tank. As seen below there is a list of records, records 1-10.

| | |
|---|---|
| Record 1<br>Record 2 | In use |
| Record 3<br>Record 4<br>Record 5<br>Record 6 | Deleted |
| Record 7<br>Record 8 | In use |
| Record 9 | Deleted |
| Record 10 | In use |

For example, as in the sketch above Records 1 and 2 are in use, Records 7 and 8 are in use as also is Record 10 in use. Then further, Record 3, 4, 5, 6 and Record 9 are deleted large objects.

Thus when the program examines the sorted list of Space-Set entries, we can see that Record 3 is the first record of a deleted LOB (LOB 3, 4) with a size of 1200 Bytes. Then Record 5 is the first record of another deleted LOB (LOB 5, 6) with a size of 1200 Bytes. Both Record 3 and Record 5 have their "LOB-Delete" flag set. Therefore, it is now known that there are two "adjacent LOBs" with one size of 1200 Bytes and another of 1200 Bytes.

Now Record 9 is the first and last record of a deleted LOB with a size of 600 Bytes. There—upon observation we can see that there are three deleted LOBs of which two are adjacent to each other. That is to say Record 3 and Record 4 of 1200 Bytes is adjacent to Record 5 and Record 6 of 1200 Bytes. The third deleted LOB is Record 9 which is the size of 600 Bytes.

In summary, the present operation of the Analyzer function provides a method to analyze the stored usage of large object (LOB) data in a Data Management System database (DMSII). Then the method will report the in-use LOB space and the available large objects (LOBs) space in Kilobyte units for each and every one of all the three tanks, large, medium and small. The report will also show the number of adjacent large objects (LOBs).

Figure 2:
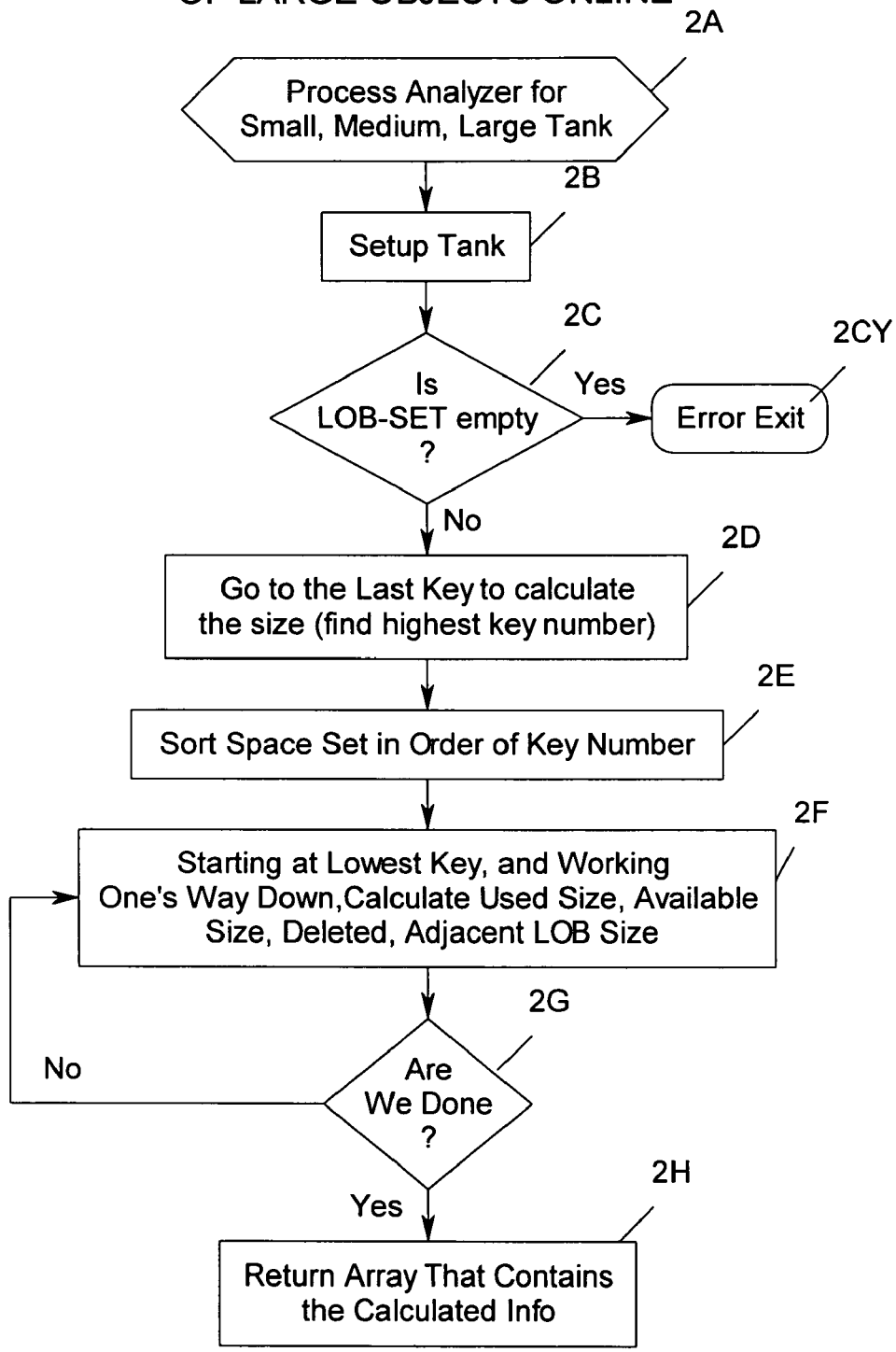
FIG. 2 is a flowchart showing the method steps involved in performing the analysis of large object (LOB) Tank structures.

FIG. 2 is a flowchart which illustrates the various steps involved to report storage usage of the large objects (LOBs) of the tank files in the database.

The method starts with step 2A which states—process analyzer for small, medium, large tank. The process analysis is a method that applies to collect all of the used spaces and available spaces in order to report back to the caller. It includes finding the available space by checking the LOB Space Set and then retrieving the size of the used space and unused space through LOB-Key. Also during this process, the Analyzer will check to see if there is any adjacent LOB data residing next to each other or also where some available space exists for future usage.

Now at step 2B, the sequence operates to set up a particular Tank. This means setting the environment index of the tank structure, the Space Set, and the Locator Set for each one of the small, medium, large tank file.

The next step involves a query which states—is the LOB-SET empty?

The LOB-SET is the environment index of the tank structure set. Step 2C operates to make sure as to whether or not there is an entry in the tank structure.

At step 2C if the answer is YES, the LOB-SET is empty, then the sequence proceeds to step 2CY to indicate an error and then to exit.

At step 2C if the answer is NO, that is to say, the LOB-SET is not empty, then the sequence proceeds to step 2D. Step 2D operates to go to the Last Key in order to calculate the size of the large object. This is done by finding the highest key number.

At step 2D the sequence works to multiply the last key with the record size of each individual record, in order to get the total used space. This space includes active and deleted LOBs in that tank file. The location of the "last key" designates that we get the "highest key" of the particular tank file via the LOB-SET. Then a pointer is positioned to the last entry in the LOB-SET in order to find the prior LOB space.

LOB-SET is an Access to a Tank dataset. The key is the record number. LOB-SET is used to locate the first record of a LOB object.

The database engine of the data management system operates to locate the last key (the highest key) of a tank file via the LOB-Set. Then the engine will position the pointer to the very last entry in that LOB-Set.

It is the "last key" of the LOB-SET that tells the number of records involved in a tank file. Thus, by multiplying the last key number with the record size, we get the total amount of used space. That is to say, the space which includes active and deleted LOBs in that particular tank file.

The next step 2E indicates the action of sorting the Space Set in order of key number. The Space Set has stored the information about the available spaces in a particular tank file. For example, in FIG. 7, it will be seen that the Space Set will store two entries: (i) key 4 with a size of 1200 bytes and (ii) key 10 with a size of 2400 bytes. By sorting the entries in the Space Set, we then get a list of available spaces and their size. And then by subtracting the available size from the total size, we then get an indication of the "in-use" size.

The next step is step 2F. This is indicated as—starting at lowest key, and working one's way up, calculate used size, available size, deleted, adjacent LOB size. The statement of working one's way up could also be designated as working one's way down. This would mean picking the lowest key and matching it with the LOB-SET until one reaches the end-of-file (EOF).

The calculation of "used size" means that this shows the size of each LOB that is presently in use in that tank.

When the LOBUTILITY program returns the calculated information back to the DMUTILITY, then the DMUTILITY will print out the report to a backup file. This will indicate the kilobytes used for each LOB. The return array contains the information of record size of tank number n in Kbyte, last record of tank n in Kbyte, last record information, deleted space of tank n, number of continuous deleted slots, and number of deleted slots in tank n.

This array is returned back to DMUTILITY (the caller). DMUTILITY program gets the info and prints it out to a back-up file.

"Available size" is the size of the unused space or the size of a deleted space as measured in kilobytes. The DMUTILITY program will report to a backup printer file from which a user can see or retrieve the information and this information will be shown as indicated in the chart in FIG. 8.

Here it will be noticed that FIG. 8 provides a summary of information for each tank, the small tank, medium tank, and large tank. Here is shown the number of areas available for re-use, the kilobytes of space presently in use, the number of deleted large objects, the number of adjacent large objects and the number of adjacent-deleted large objects. Thus the resultant information in FIG. 8 gives a present time picture of the situation for the storage spaces and large objects as they relate to each of the three storage tanks.

The next step in the sequence is step 2G. This presents a query as to whether we are done with the sequence. It is possible to tell if the sequence is done by checking that the file contains the sorted key number of the Space Set and this key number is at the end-of-file (EOF).

At step 2G, if the sequence is not done or completed, then a return is made to step 2F in order to finish off any further available calculations.

At step 2G if it is indicated that the sequence is done and accomplished then step 2H will return the array of information that contains the calculated information.

Described herein has been an enhanced DMUTILITY program. This program will call a corresponding program designated LOBUTILITY which is used to calculate various pieces of information from the various structures that store large object data. The LOBUTILITY program goes through each and every tank dataset in order to calculate the capacity of each tank file to the total number of large objects which are being used. Additionally it calculates the percentage of available space for storing new large objects and further calculates the total number of deleted large objects space in addition to the number of large object spaces that are adjacent to one another. Thus the present analysis system will serve each of the tank structures for indicating the status and condition of large object data.

While one embodiment of the present system has been described it should be understood that other variations may still be possible which will still be encompassed by the attached claims.

What is claimed is:

1. In a Database Management System wherein a server means manages the operation of specialized data files in a database holding Large Objects (LOBs) in separate Tank files which are organized to hold small-sized LOBs, of 6 KB or less, medium-sized LOBs, of size 6 KB to 60 KB, and large-sized LOBs, of sizes greater than 60 KB, and wherein each Tank holds a dataset which provides information on each item in Tank storage, a system for analyzing the status of space usage in each of said Tank files comprising: (a) first program means (DMUTILITY) for managing said database and for invoking a second program means (LOBUTILITY); (b) said second program means (LOBUTILITY) for scanning each dataset in each Tank file and including: (b1) means to calculate various capacity status information regarding each Tank file wherein said means (b1) to calculate includes: (b1a) means to calculate a total number of large objects (LOBs) being used and stored in each Tank file; (b1b) means to calculate a percentage of available space in each Tank file, involving a number of deleted large objects (LOBs); (b1c) means to calculate, for each Tank file, the number of deleted large objects (LOBs); (b1d) means to calculate, for each Tank file, the number of deleted large objects (LOBs) which reside adjacent to each other in a Tank file; (b1e) means to calculate, for each Tank file, a total number of kilobytes available for storage; (b1f) means to calculate a percentage of spaces, in each Tank file, which is available for re-use; and (b1g) means to calculate a total amount of used space, the total amount of used space being calculated by multiplying a last key number in each Tank file with a record size of each record in the Tank file.

2. The system of claim 1 which further includes: (c) means to provide a visual report on a metrics involved showing a capacity status for each Tank file.

\* \* \* \* \*